United States Patent
Marsili et al.

(10) Patent No.: US 9,007,791 B2
(45) Date of Patent: Apr. 14, 2015

(54) DIGITAL SLOPE CONTROL FOR SWITCHED CAPACITOR DC-DC CONVERTER

(75) Inventors: Stefano Marsili, Faak am See (AT); Werner Hoellinger, Klagenfurt (AT); Gerhard Maderbacher, Markt Hartmannsdorf (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/283,555

(22) Filed: Oct. 27, 2011

(65) Prior Publication Data

US 2013/0106380 A1 May 2, 2013

(51) Int. Cl.
 *H02M 3/07* (2006.01)
(52) U.S. Cl.
 CPC ...................................... *H02M 3/07* (2013.01)
(58) Field of Classification Search
 USPC .................. 363/59, 60, 61, 62; 307/109, 110; 320/121, 166; 327/536
 See application file for complete search history.

(56) References Cited

U.S. PATENT DOCUMENTS

| | | | | |
|---|---|---|---|---|
| 6,801,078 B2 * | 10/2004 | Allum | ............................ | 327/536 |
| 6,995,995 B2 * | 2/2006 | Zeng et al. | ........................ | 363/60 |
| 7,408,332 B2 * | 8/2008 | Yee | ................................ | 323/282 |
| 7,479,770 B2 | 1/2009 | Kohout et al. | | |
| 7,511,560 B2 | 3/2009 | Yen et al. | | |
| 7,995,364 B2 * | 8/2011 | Shiu | ................................ | 363/60 |
| 8,264,273 B2 * | 9/2012 | MacFarlane | ................... | 327/536 |
| 2003/0180997 A1 | 9/2003 | Nakayama et al. | | |
| 2005/0093615 A1 * | 5/2005 | Saiki et al. | ...................... | 327/536 |
| 2009/0039947 A1 * | 2/2009 | Williams | ........................ | 327/536 |
| 2011/0128761 A1 * | 6/2011 | Ripley et al. | ..................... | 363/62 |
| 2011/0279173 A1 * | 11/2011 | Singnurkar | .................... | 327/536 |
| 2012/0069618 A1 * | 3/2012 | Yim et al. | ...................... | 363/131 |
| 2012/0235730 A1 * | 9/2012 | Quan et al. | ..................... | 327/536 |
| 2012/0249224 A1 * | 10/2012 | Wei et al. | ....................... | 327/536 |

FOREIGN PATENT DOCUMENTS

| | | |
|---|---|---|
| CN | 101009464 A | 8/2007 |
| CN | 101136586 A | 3/2008 |
| CN | 101483424 A | 7/2009 |
| CN | 201590809 U | 9/2010 |

* cited by examiner

*Primary Examiner* — Gary L Laxton
*Assistant Examiner* — Kyle J Moody
(74) *Attorney, Agent, or Firm* — SpryIP, LLC

(57) ABSTRACT

Representative implementations of devices and techniques minimize switching losses in a switched capacitor dc-dc converter. The slope of the charging and/or discharging phase may be modified, smoothing the transitions from charge to discharge and/or discharge to charge of the switched capacitor.

14 Claims, 10 Drawing Sheets

DIGITAL SLOPE CONTROL FOR SWITCHED CAPACITOR DC-DC CONVERTER

BACKGROUND

Various mobile or portable electronic devices may have reduced power consumption by operating some of the systems within these devices at low voltages (e.g., 3.0 volts, 1.5 volts, etc.). Such electronic devices often use direct current to direct current converters ("dc to dc converters" or "dc-dc converters") to "step down" voltages available from their power supplies to the lower voltages used by these systems.

Typical dc-dc converters include switched capacitor dc-dc converters, which may contain one or more switches controlling one or more "flying capacitors." The switches determine when the flying capacitors charge and discharge to supply power to the load. The flying capacitors may charge from a regulated current source and may discharge at least in part to a "buffer" or output capacitor coupled in parallel with the load.

However, switched capacitor dc-dc converters generally suffer from switching losses. Switching losses include power loss resulting from power used to operate the switches. These switching losses may not scale with the load current being supplied, since in many cases, the operation of the switches is consistent regardless of the load. For example, the switches may require the same energy per switching event regardless of the load, and a same number of switches may be operative for a wide range of load currents supplied by the dc-dc converter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1A:
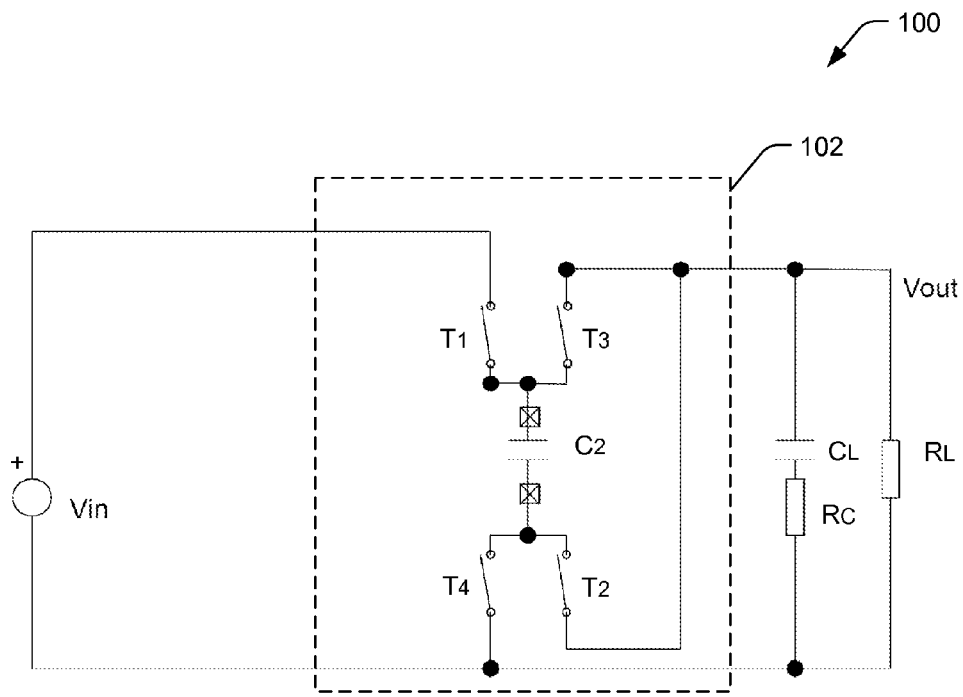
FIG. 1A is schematic of an example switched capacitor dc-dc converter in which the techniques in accordance with the present disclosure may be implemented.

Representative implementations of techniques and/or devices provide control of switching characteristics in a switched capacitor dc-dc converter. In various implementations, the switching characteristics are modified based on load characteristics (e.g., magnitude of the load current). The switching characteristics may be modified to reduce, minimize, or eliminate switching losses in the dc-dc converter.

A typical switched capacitor dc-dc converter contains one or more switches controlling one or more energy storage capacitors (aka. "flying capacitors"). In one implementation, the operation of the switches (i.e., switching "on" and "off" the switches) may be modified by cutting in and out individual switches or groups of switches based on the load. For example, a minimum number of switches may be operative at a given time, for a given load, with other switches being fixed in an open or a closed state. With changes in the load, one or more switches may be cut in or cut out to accommodate the changed load, resulting in more or less switches being operative and the remaining switches being in a fixed state.

In an alternate implementation, one or more switches may be comprised of a plurality of individually operable sub-switches. Individual sub-switches or groups of sub-switches may be operative at a given time for a given load, with other switches and/or sub-switches being fixed in an open or a closed state. In further implementations, the switches and/or sub-switches may be selected for operation using a digital controller, for example. A regulated output voltage may be finely adjusted and switching losses may be closely managed, based on a number of switches and/or sub-switches used in a dc-dc converter. For example, a greater number of sub-switches used may allow for a finer adjustment to the regulated output voltage and tighter control of switching losses.

Various implementations of switching control for a switched capacitor dc-dc converter are discussed in this disclosure. Techniques and devices of switching control are discussed with reference to example dc-dc converter circuit schematics and various related waveforms illustrated in the figures. The techniques and devices discussed may be applied to any of various dc-dc converter designs, circuits, and devices and remain within the scope of the disclosure.

Advantages of the disclosed techniques and devices are varied, and include: 1) accurate and precise switching control in low current operation; 2) quantization of selected switches, numbers of switches operated, and switch operation control voltages; 3) improved efficiency of the dc-dc converter at low current loads; 4) reduced energy used for switching events; 5) an ability to select sub-sets of switches for operation while remaining switches are fixed; and 6) no additional regulated current sources outside the switching network are necessarily used. Advantages of the disclosed techniques may be more apparent in applications and designs where current magnitudes are designed to be lower and frequencies are designed to be higher.

Implementations are explained in more detail below using a plurality of examples. Although various implementations and examples are discussed here and below, further implementations and examples may be possible by combining the features and elements of individual implementations and examples.

Example Switched Capacitor DC-DC Converter

FIG. 1A is a schematic drawing showing an illustrative dc-dc converter circuit 100, wherein techniques and/or devices to provide switching control (e.g., programmable switching, switch timing, etc.) may be employed. It is to be understood that the techniques and/or devices may be implemented as part of the dc-dc converter circuit 100, or as part of another system (for example as a peripheral to a dc-dc converter 100, etc.). The illustrated dc-dc converter in FIG. 1A is shown and described in terms of a "buck" device, which reduces the input DC voltage ($V_{IN}$) to a desired lower output DC voltage ($V_{OUT}$). This illustration is, however, for ease of discussion. The techniques and devices described herein with respect to switching control for dc-dc converters is not limited to a buck device, and may be applied to other types of dc-dc converters (e.g., boost, buck-boost, etc.) without departing from the scope of the disclosure. While the disclosure discusses switched capacitor type dc-dc converters, various other types of dc-dc converters may employ techniques and/or devices discussed herein. Accordingly, the generic term "dc-dc converter" is used throughout.

As shown in FIG. 1A, an example dc-dc converter 100 may be designed with a network 102 of switches (such as switches T1, T2, T3, and T4) and energy storage elements (such as energy storage element C2). In an implementation, one or more of the switches T1-T4 may control the charging and/or discharging of the energy storage element C2. The one or more switches T1-T4 may do so by opening and closing according to a timing scheme to allow charging from a voltage source (such as $V_{IN}$), and discharging to a load (shown as load $R_L$). In FIG. 1A, four switches (T1, T2, T3, and T4) are illustrated for ease of discussion. In various implementations, more switches or fewer switches may also be used in a dc-dc converter 100.

The load $R_L$ may represent a device, a system, or the like, that is supplied with power by the dc-dc converter 100, and consumes a current load. For example, the load $R_L$ may represent a sub-system of a communications device, a microcontroller, or the like. In some implementations, as shown in FIG. 1A, an example dc-dc converter 100 may include a load capacitance $C_L$ (i.e., buffer capacitor) and an associated impedance $R_C$ in parallel with the load $R_L$. In such implementations, the energy storage element C2 also discharges energy to the load capacitance $C_L$, making additional energy available to the load $R_L$, and buffering load variations. The output of the dc-dc converter 100 ($V_{OUT}$) is shown in the example of FIG. 1A as the voltage across the load $R_L$.

In various implementations, switches T1-T4 may be implemented with metal-oxide semiconductor (MOS) devices, such as P-type Metal Oxide Semiconductor (PMOS) and/or N-type Metal Oxide Semiconductor (NMOS) devices or transistors, controlled via a clock signal, for example. In other implementations, switches T1-T4 may be implemented using diodes, other types of transistors, or the like. Energy storage device C2 may be implemented with a capacitor, or a like energy storage device.

The number of energy storage elements C2 used in an example dc-dc converter may be chosen based on the ratio of input voltage ($V_{IN}$) to output voltage ($V_{OUT}$), to maximize the energy transfer from the input source to the output load. In example implementations, for a ratio of 2:1 ($V_{IN} \geq 2 \times V_{OUT}$), one energy storage element C2 may be sufficient, and for a ratio of 3:1 ($V_{IN} \geq 3 \times V_{OUT}$), two energy storage elements C2 may be used, and so on. Accordingly, additional energy storage elements C2 may require additional switches T1-T4 (see, for example, network 104 of FIG. 1B).

Example operation may be illustrated using the circuit of FIG. 1A, showing an implementation of a 2:1 ratio dc-dc converter 100. The described operation is not limited to the circuit shown, and may also apply to various other circuit configurations of dc-dc converters. Included are an energy storage element C2, switches T1 and T3 coupled to a first terminal of C2, and switches T2 and T4 coupled to a second terminal of C2.

By opening and closing the switches, the first terminal of C2 can be connected with the switch T1 to the positive terminal of the input source $V_{IN}$, or can be connected with switch the T3 to the positive terminal of the buffer capacitor $C_L$ (and $V_{OUT}$). The second terminal of C2 can be connected either to the negative terminal of the input source $V_{IN}$ via T4 or to the positive terminal of the buffer capacitor $C_L$ (and $V_{OUT}$) via T2. In an implementation, one or more of the switches T1-T4 may be programmable to rest in a fixed state while one or more others of the switches toggle states during a preset number of switching cycles.

An energy transfer may be obtained by alternating two different switch configurations as described below. In a first phase T1 and T2 are closed and T3 and T4 are open. The energy storage element C2 is in series to the buffer capacitor $C_L$. Energy flows from the source $V_{IN}$ to the output and charges C2. During the second phase, T3 and T4 are closed and T1 and T2 are open. The energy storage element C2 is now in parallel to the buffer capacitor $C_L$. The energy stored in energy storage element C2 during the first phase is transferred to the buffer capacitor $C_L$ and to the load $R_L$.

In one implementation, during steady state, the energy storage element C2 and the buffer capacitor $C_L$ will have a voltage which is substantially equal to $V_{OUT}$. Therefore, during the first phase when the energy storage element C2 and the buffer capacitor $C_L$ are connected in series, an energy transfer from the source $V_{IN}$ occurs when $V_{IN} \geq 2 \times V_{OUT}$. In an implementation, the closer $V_{IN}$ is to $2 \times V_{OUT}$, the more efficient the energy transfer will be.

For the purposes of this discussion, it is assumed that there is an ideal transition between the two phases described above. However, the techniques described are not limited to this case. In some implementations, additional phases might be used between the two phases in order to avoid short circuit situations. The inclusion of additional phases remains within the scope of the disclosure.

Figure 1B:
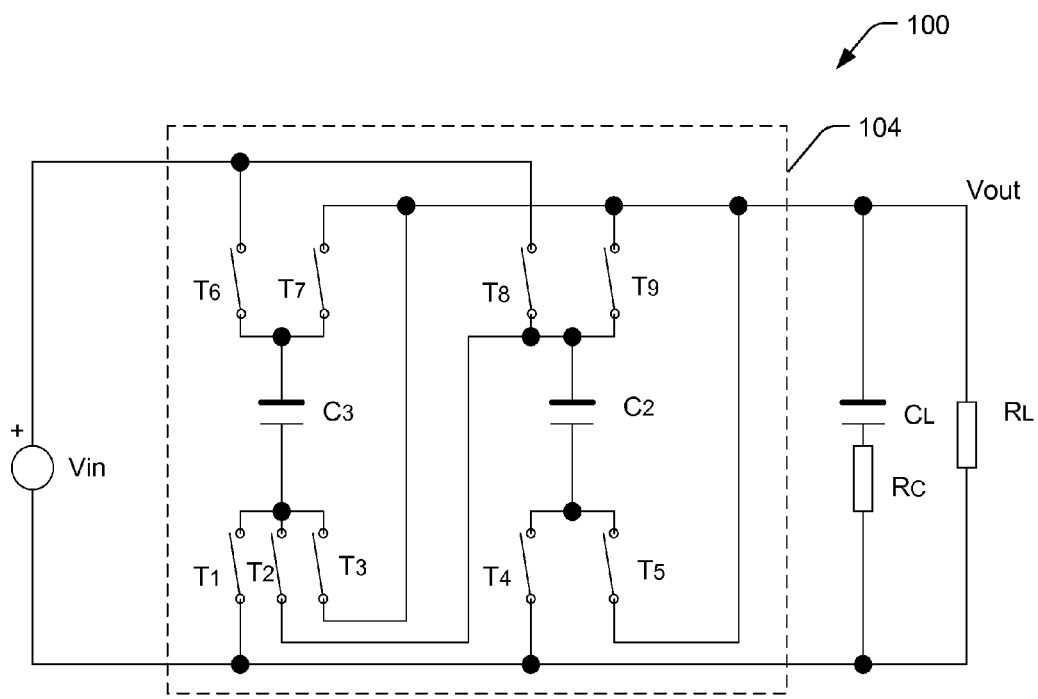
FIG. 1B is a schematic of an example switched capacitor dc-dc converter having a plurality of energy storage capacitors and a plurality of switches according to an implementation.

FIG. 1B is a schematic of an example switched capacitor dc-dc converter having a network 104 including a plurality of energy storage elements (C2 and C3) and a plurality of switches (T1-T9) according to an implementation. As shown in FIG. 1B, the switches of a dc-dc converter 100 may be configured in a first switching configuration such that the energy storage elements C2 and C3 are in series, and may be configured in a second switching configuration such that the energy storage elements C2 and C3 are in parallel. Further, the switches of a dc-dc converter 100 may also be configured in a third switching configuration such that the energy storage elements C2 and C3 are in series with the output capacitor $C_L$, and may be configured in a fourth switching configuration such that the energy storage elements C2 and C3 are in parallel with the output capacitor $C_L$. Alternate or additional configurations are also possible in other implementations.

In various implementations, the principles of operation discussed above with reference to FIG. 1A apply to the dc-dc converter 100 of FIG. 1B. Additionally, in various implementations, at least three modes of operation may be realized with the circuit of FIG. 1B.

Figure 2A:
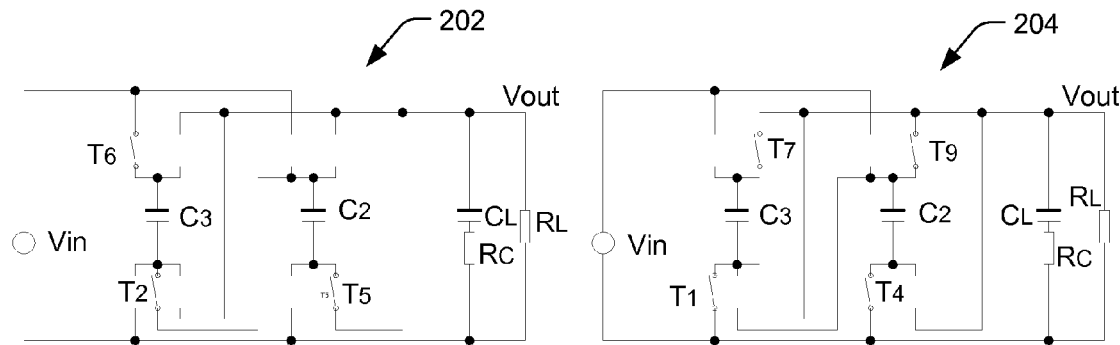
FIG. 2A is a schematic drawing of an example first mode of operation of the dc-dc converter circuit of FIG. 1B.

Referring to FIG. 2A, a first example mode of operation is described as follows. The first mode uses a 3:1 ratio ($V_{IN} \geq 3 \times V_{OUT}$). In a first phase, illustrated in FIG. 2A as circuit configuration 202, switches T6, T2, and T5 are closed, and the remaining switches are open. The energy storage elements C2 and C3 are in series to the buffer capacitor $C_L$. Energy flows from the source $V_{IN}$ to the output $V_{OUT}$, and charges C2 and C3. During the second phase, illustrated in FIG. 2A as circuit configuration 204, switches T1, T7, T9 and T4 are closed, with the remaining switches open. The energy storage elements C2 and C3 are now in parallel to the buffer capacitor $C_L$. The energy stored in energy storage elements C2 and C3 during the first phase is transferred to the buffer capacitor $C_L$.

In steady state, energy storage elements C2 and C3 and buffer capacitor $C_L$ will have a voltage which is approximately equal to $V_{OUT}$. Therefore, during the first phase, an energy transfer from the source $V_{IN}$ is accomplished when $V_{IN} \geq 3 \times V_{OUT}$. The closer $V_{IN}$ is to $3 \times V_{OUT}$, the more efficient the energy transfer will be.

Figure 2B:
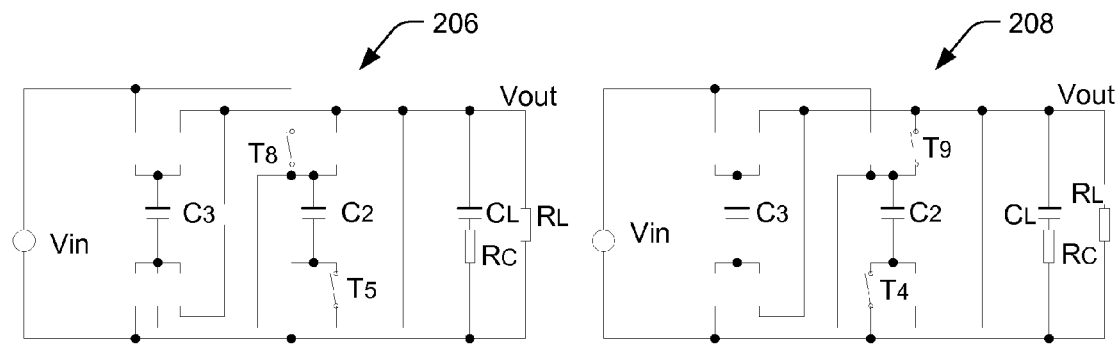
FIG. 2B is a schematic drawing of an example second mode of operation of the dc-dc converter circuit of FIG. 1B.

Referring to FIG. 2B, a second example mode of operation is described as follows. The second mode uses a 2:1 ratio ($V_{IN} \geq 2 \times V_{OUT}$). In the second mode, only one energy storage element is used, for instance, C2. In a first phase, illustrated in FIG. 2B as circuit configuration 206, switches T4 and T9 are open and switches T8 and T5 are closed. The energy storage element C2 is in series to the buffer capacitor $C_L$. Energy flows from the source $V_{IN}$ to the output $V_{OUT}$ and charges energy storage element C2. During the second phase, illustrated in FIG. 2B as circuit configuration 208, switches T8 and T5 are open and switches T4 and T9 are closed. The energy storage element C2 is now in parallel to the buffer capacitor $C_L$. The energy stored in energy storage element C2 during the first phase is transferred to the buffer capacitor $C_L$.

In steady state, energy storage element C2 and buffer capacitor $C_L$ will have a voltage which is approximately equal to $V_{OUT}$. Therefore, during the first phase, an energy transfer from the source $V_{IN}$ is accomplished when $V_{IN} \geq 2 \times V_{OUT}$. The closer $V_{IN}$ is to $2 \times V_{OUT}$, the more efficient the energy transfer will be.

In alternate implementations, the switches connected to the second energy storage element C3 do not necessarily need to be all open as in FIG. 2B. A special (static) configuration of the switches coupled to C3 can be selected in order to make a transition from the second mode to the first mode or to the third mode smoother.

Figure 2C:
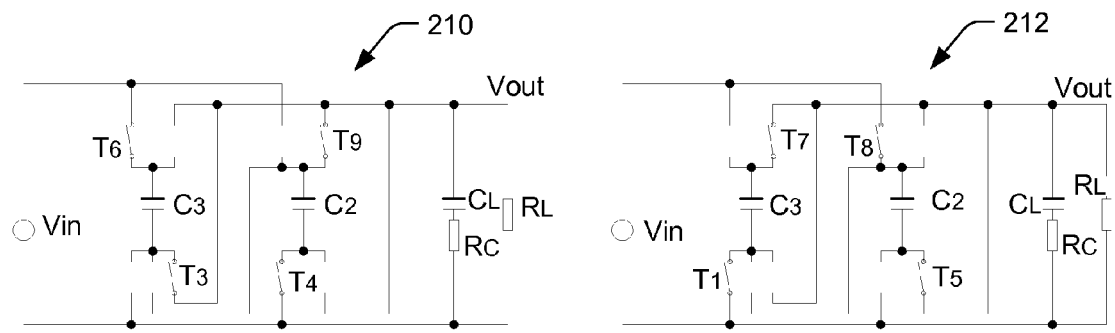
FIG. 2C is a schematic drawing of an example third mode of operation of the dc-dc converter circuit of FIG. 1B.

Referring to FIG. 2C, a third example mode of operation is described as follows. The third mode also uses a 2:1 ratio ($V_{IN} \geq 2 \times V_{OUT}$), but uses both energy storage elements C2 and C3 in a "push pull" configuration.

The third mode is generally equivalent to the second mode, but in this case, both energy storage elements C2 and C3 are used. In the first phase, illustrated in FIG. 2C as circuit configuration 210, while C3 is charging, C2 is discharging. In the second phase, illustrated in FIG. 2C as circuit configuration 212, while C3 is discharging, C2 is charging. The third mode has a current capability which is double compared to the second mode.

As above, for the purposes of this discussion, it is assumed that there is an ideal transition between the two phases of each mode described above. However, the techniques described are not limited to this case. In some implementations, additional phases in one or more of the modes might be used between the two phases in order to avoid short circuit situations. The inclusion of additional phases in one or more of the modes remains within the scope of the disclosure.

Additionally, other modes of operation are also within the scope of the disclosure, including modes using other voltage ratios (including 1:1 ratios or step-up ratios), modes including additional energy storage elements and/or switches, and modes including other components having similar operation. Further, dc-dc converters having additional components to the schematics are also within the scope of the disclosure.

Example Switching Control

In an implementation, one or more of the switches T1-T9 may function similar to a variable resistor. For example, when one or more switches are implemented as metal-oxide-semiconductor (mos) devices, the gate-source voltage of the mos devices may be analogous to a variable impedance of the switch. When a switch is open, the impedance of the switch is very high (e.g., mega-ohms range). Conversely, when the switch is closed, the impedance of the switch (aka. "on" resistance ($R_{ON}$)) is very low. In various implementations, the value of $R_{ON}$ for a switch determines a maximum current the dc-dc converter 100 can transfer from the input source to the output (see FIGS. 1A and 1B).

In an implementation having a single energy storage element C2 as shown in FIG. 1A, assuming that all switches have the same value of $R_{ON}$, the maximum current that can be transferred can be expressed as:

$$Imax=(V_{IN}-2 \times V_{OUT})/(2 \times R_{ON}) \quad (1)$$

For example, assuming $V_{IN}$=3.3V, $V_{OUT}$=1.5 V, $R_{ON}$=0.5 ohm, the maximum current that an example dc-dc converter of FIG. 1A provides to a load is 150 mA. If a requested current load is larger than 150 mA, it may not be possible to obtain the desired output voltage $V_{OUT}$=1.5V. On the other hand, for all load currents below 150 mA it may be possible to set the output voltage $V_{OUT}$=1.5V. Assuming instead that the requested current load is 50 mA, the output voltage obtained in open loop by switching between the two phases described above may be expressed as:

$$Vout\_ol=(V_{IN}-Iload \times 2 \times (2 \times R_{ON}))/2=1.6 \text{ V} \quad (2)$$

This yields an output voltage that is 100 mV larger than the requested 1.5V. Thus, techniques of adjusting switch impedance described below may also be used to control the output voltage as necessary.

In various implementations, the on resistance $R_{ON}$ of one or more of the switches T1-T9 may be selected and the impedance of the one or more switches T1-T9 adjusted. In one implementation, the impedance of one or more of the switches T1-T9 is adjustable based on the load coupled to the output of the dc-dc converter 100.

Figure 3A:
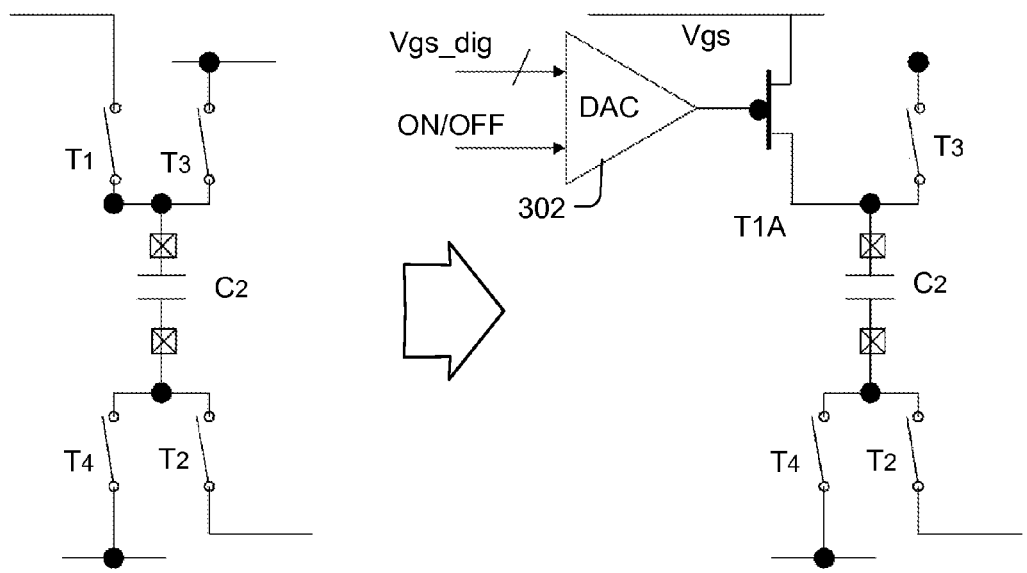
FIG. 3A is a schematic drawing of a portion of a switched capacitor dc-dc converter using a digital to analog converter according to an implementation.

In one implementation, at least one of the switches T1-T9 includes a digital-to-analog converter (DAC) 302 arranged to adjust the impedance of the switch. This is illustrated in FIG. 3A, where switch T1 is shown implemented as a mos transistor T1A, for example. The transistor T1A is turned "on," (i.e., T1A is in a conducting state), meaning the switch T1A is closed, when the gate-source voltage ($V_{GS}$) is large enough. In the example shown in FIG. 3A, the $V_{GS}$ of switch T1A for the "on" phase can be programmed by the DAC, effectively adjusting the impedance of the switch T1A. The $V_{GS}$ of the switch T1A for the "off" phase is the voltage below the threshold of the T1A mos device.

Returning to the example above, with a dc-dc converter 100 having a requested current load of 50 mA, and assuming the on resistance of switch T2 ($R_{ON\_2}$) is 0.5 ohm, the on resistance of the switch T1A ($R_{ON\_1A}$) may be determined by substituting in equation (2):

$$Iload=(V_{IN}-2\times V_{OUT})/2/(R_{ON\_1A}+R_{ON\_2}).$$

Solving for $R_{ON\_1A}$ yields:

$$R_{ON\_1A}=(V_{IN}-2\times V_{OUT}-2\times R_{ON\_2}\times Iload)/(2\times Iload)$$

$$R_{ON\_1A}=2.5 \text{ ohm}.$$

Thus, in an implementation, the impedance of a switch implemented with a mos device, may be determined using the equation:

$$R_{ON} = \frac{1}{\mu C_{ox}\frac{W}{L}(V_{GS} - V_{TH})} \quad (3)$$

Thus, a DAC 302 may be used, for example, to adjust the $V_{GS}$ of a switch and yield the desired impedance for the switch. In various implementations, several or all of the switches T1-T9 of a dc-dc converter 100 may be implemented using a DAC 302 arranged to adjust the impedance of the switches. In some implementations, one or more of the switches T1-T9 may be selected for impedance adjustment based on a digital word. Further, each of the switches may be selected for impedance adjustment based on a separate digital word associated to each respective switch. This may be the case when each switch is implemented with a DAC 302. A digital word may be comprised of a preset number of bits, where each of the bits may represent switching information, such as: identifying the switch, representing a desired impedance for the switch, conveying other control information, etc. In some implementations, the digital word may be an input to the DAC 302 (such as Vgs_dig in FIG. 3A).

In various implementations, the techniques described above may be applied to the conductance ($G=1/R_{ON}$) of switches T1-T9 during their "on" state, for example.

Figure 3B:
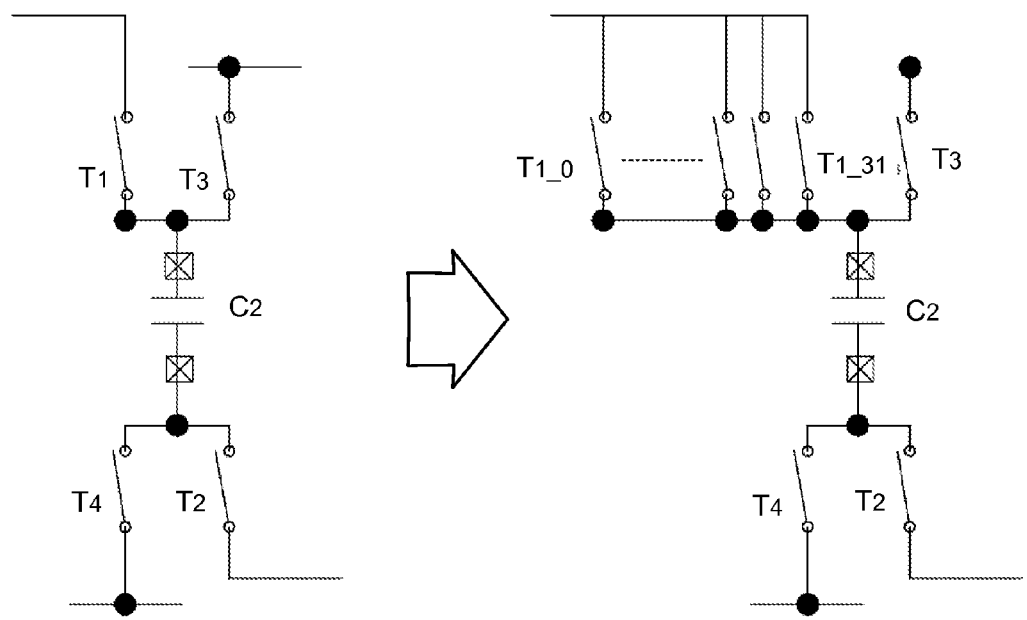
FIG. 3B is a schematic drawing of a portion of a switched capacitor dc-dc converter using a plurality of sub-switches according to an implementation.

In another implementation, as shown in FIG. 3B, a switch (switch T1, for example) may be implemented using a plurality of independently controllable sub-switches (T1_0-T1_31). In an implementation, the maximum impedance of each individual sub-switch is substantially equivalent to the maximum impedance of the switch (T1, for example) divided by the number of sub-switches implemented to represent switch T1. In another implementation, one or more of the sub-switches may be weighted (e.g., binary weighted).

In some implementations, the sub-switches (T1_0-T1_31) are arranged in parallel as shown in FIG. 3B. In other implementations, the sub-switches may be arranged in other configurations, including combinations of series and parallel arrangements. In a further implementation, the impedance or conductance of a sub-set of the sub-switches (or all of the sub-switches) may be adjustable as described above. The schematic of FIG. 3B shows 32 sub-switches (T1_0-T1_31) for illustration and discussion. In alternate implementations, fewer or greater numbers of sub-switches may be employed. The number of sub-switches used may impact the degree of switch losses that are experienced by a dc-dc converter 100. For example, with a greater number of sub-switches, a finer adjustment of sub-switches being operable for a given load may be possible. Accordingly, fewer or smaller switches and/or sub-switches may be used; resulting in reduced power used by the switches or sub-switches, and reduced switching losses.

In an implementation, individual sub-switches or groups (sub-sets) of sub-switches may be programmed to be operative (i.e., switching or toggling states) at a given time for a given load, with other sub-switches being fixed in an open or a closed state. For example, fewer sub-switches may be operative for a smaller load than for a greater load. Thus, in various implementations, optimization of the number of operative sub-switches may be performed in each switching cycle. In further implementations, the switches and/or sub-switches may be selected for operation using digital logic or a digital controller, for example, and set to toggle or remain fixed for a preset number of switching cycles, based on a load.

Returning again to the example above, setting the appropriate $V_{GS}$ of a switch T1 is substantially equivalent to turning on a sub-set of sub-switches (T1_0-T1_31) representing T1. For example, to achieve the equivalent of the $R_{ON\_1A}=2.5$ ohm, 6.4 sub-switches of the 32 sub-switches (as in FIG. 3B) may be turned on, where each sub-switch has an impedance of $R_{ON\_i}=16$ ohm. To obtain this sub-switch configuration, six sub-switches may be turned on, and a seventh sub-switch may be alternately turned on and off with a ratio of 60/40%. This technique is effective using any of the switches T1-T4 in the network 102. Further, the programming technique described is also effective when considering two or more switches operated concurrently.

In some implementations, an impedance or conductance of one or more of the sub-switches (T1_0-T1_31) or a sub-set of the sub-switches may be adjustable based on a digital word. Further, an impedance or conductance of each of the sub-switches (T1_0-T1_31) of a sub-set may be adjustable based on a separate digital word associated to each respective sub-switch. The use of separate digital words for either switches or sub-switches allows for better resolution. For example, with the separate switches or sub-switches having programmable impedances rather than equivalent impedances, a finer resolution may be achieved by combining unlike impedances (associated with respective switches). Again, the number of switches operable (and the associated switching losses) may be based on the load current.

For instance, referring to the circuit of FIG. 1A, and assuming that a digital word is a 6 bits number, 64 different combinations may be realized. Given 32 subsections per switch, as in FIG. 3B, and where P is the digital representation of the switch impedance that is needed to drive a particular load, the number of sub-switch may be selected as:

For $T1$ and $T3 \rightarrow \text{floor}(P/2)$

For $T2$ and $T4 \rightarrow \text{floor}(P/2)+\text{mod}(P,2)$

In an implementation, this coding is monotonic and provides 64 impedance values with 32 sub-switches per switch. The method can also be extended to reduce further to 16 sub-sections:

For $T1 \rightarrow \text{floor}(P/4)$

For $T2 \rightarrow \text{floor}(P/4)+(\text{mod}(P,4)>=1)$

For $T3 \rightarrow \text{floor}(P/4)+(\text{mod}(P,4)>=2)$

For $T4 \rightarrow \text{floor}(P/4)+(\text{mod}(P,4)>=3)$

In an implementation, the same technique can also be used to program the four $V_{GS}$ values of the four switches T1-T4. In additional implementations, the same technique can be used to program other switches, such as switches T1-T9 of FIG. 1B, and the like.

Example Implementations

In various implementations, the techniques described above may be used in conjunction with other techniques and/or devices to control switching in a dc-dc converter (such as dc-dc converter 100). For example, in one implementation, a system (such as the system 400 of FIG. 4) may include a dc-dc converter 100, having a switching network 102 (or 104) with switches T1-T4 (or T1-T9) having adjustable impedance or conductance, as described above. The dc-dc converter 100 is not explicitly illustrated in FIG. 4, but is understood to include components as discussed above (and shown in FIGS. 1-3B), or like components. In some implementations, a dc-dc converter 100 includes some or all of the components illustrated in the system 400 of FIG. 4.

A system 400 may include a digital controller 402 arranged to adjust the impedance or conductance of one or more of the switches T1-T9, or all of the switches T1-T9, of the switching network 102 or 104. In various implementations, a digital controller 402 may be arranged to adjust the impedance or conductance of one or more of the switches T1-T9, based on a load $R_L$ coupled to an output of the dc-dc converter 100. In one implementation, the digital controller 402 may generate or provide a digital word, as described above, to adjust the impedance or conductance of the switches. The digital controller 402 may generate information such as switch identification, impedance or conductance information of one or more switches, and the like, incorporated within a digital word. In another implementation, the digital controller 402 is arranged to adjust a gate-source voltage of one or more switches implemented as MOS transistors.

In various implementations, a system 400 may include a feedback loop 406 arranged to feed an output voltage of the dc-dc converter 100 back into the digital controller 402. For example, the feedback loop 406 may provide error correction relating to the output voltage of the dc-dc converter 100. In one implementation, the feedback loop 406 feeds the output voltage to the digital controller 402 via an analog to digital converter (ADC) 408. For example, the output voltage $V_{OUT}$ may be sampled by the ADC 408 in preparation for receipt by the digital controller 402. In an alternate implementation, a comparator is used in place of the ADC 408, where the comparator may have 1-bit resolution, for example. In one implementation, the digital controller 402 calculates the value of the impedance or conductance of one or more of the switches T1-T9 in their "on" phase. In another implementation, the digital controller calculates the mode of operation for the dc-dc controller 100 (such as the first, second, or third modes of operation discussed above).

Figure 4:
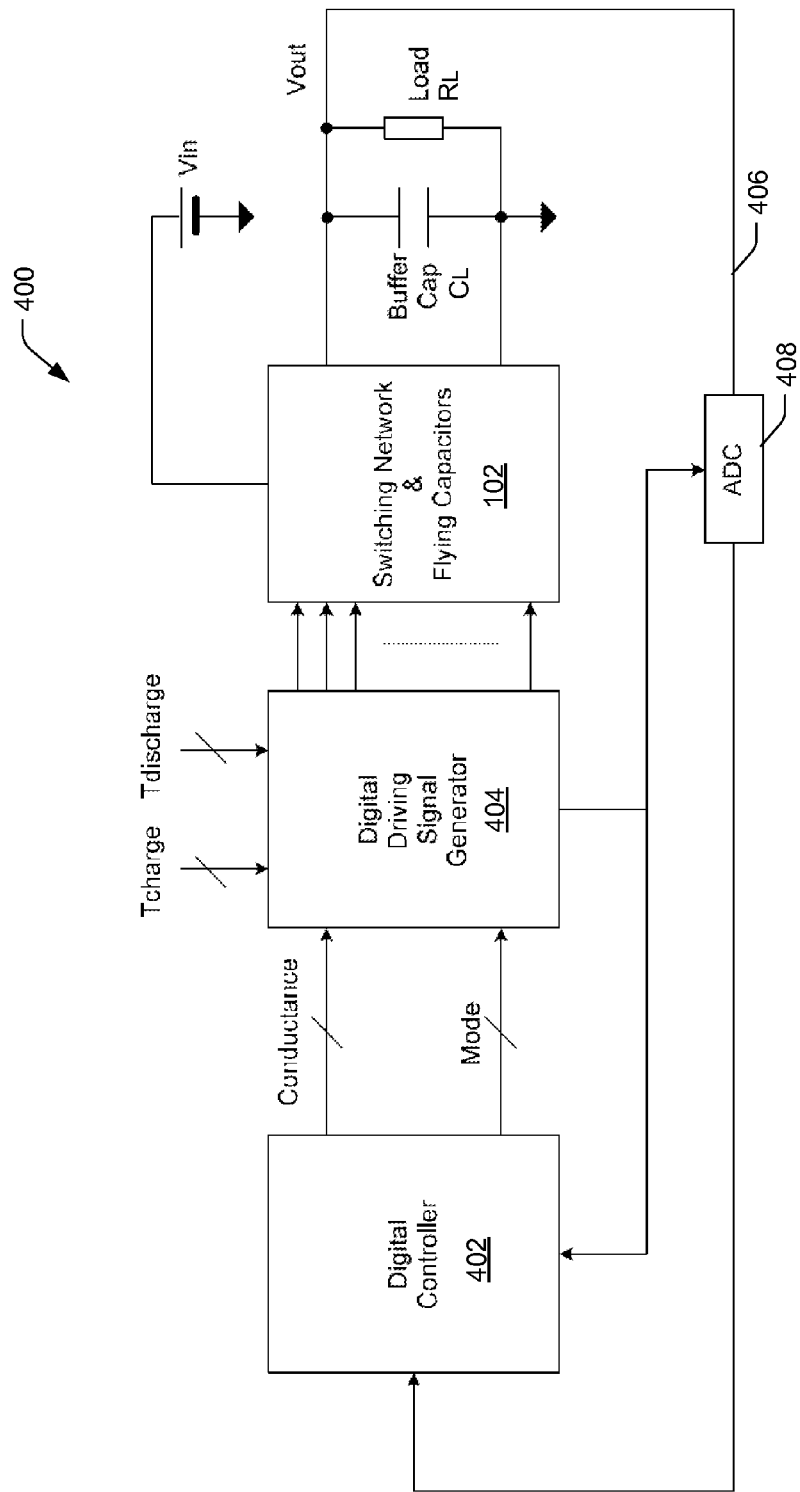
FIG. 4 is a block diagram of a digital regulation loop for a dc-dc converter according to an example implementation.

As shown in FIG. 4, a system 400 may also include a digital driving signal generator 404. In an implementation, the values of the impedance/conductance and the mode enter the signal generator 404, if included, which generates the driving signal (digital word) output to the switches T1-T9. In an implementation, the signal generator 404 also reads the duration of the charge phase (Tcharge) and the discharge phase (Tdischarge) as parameters. In one implementation, the signal generator 404 generates a switch configuration for the charge phase based on the impedance/conductance and mode information, waits a programmed time Tcharge, and generates a switch configuration for the discharge phase based on the impedance/conductance and mode information. The signal generator 404 then waits the programmed time Tdischarge before repeating the cycle.

In one implementation, the durations Tcharge and Tdischarge are fixed, at least temporarily, causing the dc-dc converter 100 to operate at a fixed switching frequency (1/(Tcharge+Tdischarge)) during that time. To change to a different switching frequency, it is sufficient to change the values of Tcharge and/or Tdischarge. Additionally, randomly modulating Tcharge or Tdischarge or both results in a frequency spreading effect. Thus, in one implementation, the digital controller 402 is arranged to determine a switching frequency of the dc-dc converter 100 based on the charging time and/or the discharging time of one or more energy storage capacitors (e.g., C2 and C3).

In an implementation, the impedance/conductance information and/or the mode information changes once per switching cycle (e.g. before starting a charge phase). In other implementations, the impedance/conductance information and the mode information changes at other intervals, for example, oversampling or under-sampling can be used in a system 400. In an implementation, the digital driving signal generator 404 schedules the information update. In another implementation, the signal generator 404 schedules the sampling events of the ADC 408 (clock divider function). In various implementations, the ADC 408 can be triggered to sample twice per switching period (e.g. just before the beginning of the charge and discharge phases, or at the end of the charge and discharge phases). In alternate implementations, oversampling or under-sampling can be used.

Figure 5:
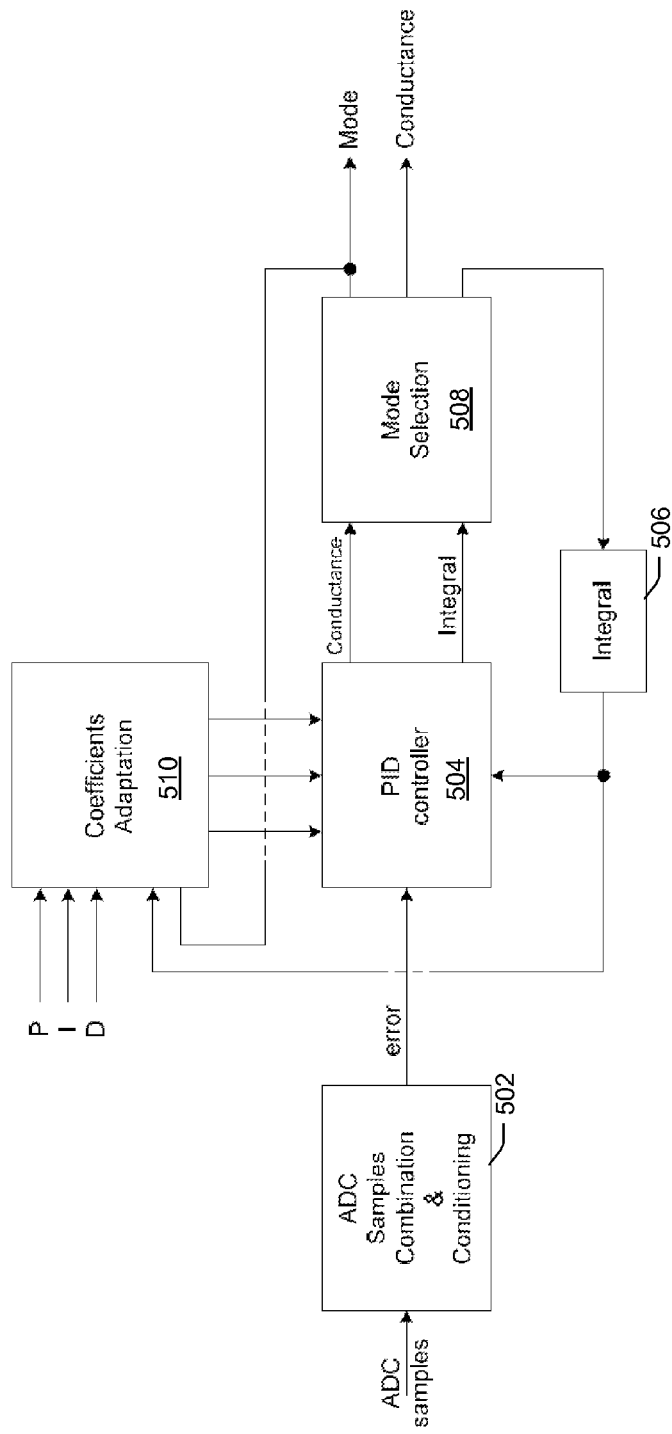
FIG. 5 is a block diagram of a digital controller for a dc-dc converter according to an example implementation.

The block diagram of FIG. 5 shows example functional blocks that may be included in the digital controller 402, according to various implementations. From one or several ADC 408 samples, error information may be generated, as shown at block 502. For example, two or more samples per switching period could be summed to generate an error signal. The error signal indicates how far the output voltage is from the target voltage of the dc-dc converter 100.

In an implementation, the error information is provided to a PID controller 504. In one implementation, a digital controller 402 can be simplified to include a PI controller ("D" coefficient equal to 0). The coefficients P, I, D may be provided by an external block, which adapts the coefficients according to the operating conditions of the dc-dc converter 100 or the system 400. The PID controller 504 receives a set of fixed coefficients P, I, D (typically D=0) and adapts them according to the selected mode (e.g., first, second, or third modes of operation) and the operating conditions. In one implementation, the load current (one operating condition, for example), is read from the integrator 506, and passed to the PID controller 504.

The PID controller 504 updates the value of the conductance based on the information received, and outputs a conductance value to program the switches that are turned "on." The generated conductance value can be applied to all the switches or to a selection (sub-set) of switches (or sub-switches).

If included, a mode selection block 508 determines whether a mode change is desired prior to providing the impedance/conduction information to the switches. In some implementations, a mode change is determined when the requested load current is large (e.g. determine a change from the second mode to the third mode or from the first mode to the second mode) or when the load current is so low that a mode with a better efficiency can be selected (e.g. determine a change from the third mode to the second mode or from the second mode to the first mode). As a result of some mode changes, the impedance/conductance information and the Integral part of the PID information are rescaled to avoid transients in the output voltage.

In an example implementation, the dc-dc converter 100 may be operating in the second mode and the conductance of all switches T1-T9 may be programmed. The small signal transfer function P(s) of the system 400, from the conductance G to the output voltage $V_o$ can be calculated according to the equations:

$G=Gdc+g$ ($Gdc$=steady state, $g$=conduction variation)

$Vo=V_{OUT}+vo$ ($V_{OUT}$=steady state, $vo$=voltage variation)

$R=V_{OUT}/Iload$; (Load resistance)

$Gdc=4*Iload/(Vi-2*V_{OUT})$;

$P(s)=vo(s)/g(s)=K0\times(Vi-2*V_{OUT})/2/((Gdc+2/R)+s*C)$; (transfer function)

The transfer function P(s) is a first order system, where the corner frequency and the DC gain are changing according to the load current. In various implementations, the DC gain of the system 400 is inversely proportional to the load current and finally to the Gdc. For high frequencies the integrating behavior is independent from the load current.

Accordingly, for many applications of a system 400, a PI controller is sufficient. A fixed set of coefficients can be used in some implementations, but in other implementations, to improve efficiency, the dependency may be removed from the load current. For example, the "P" coefficient may remain constant while the "I" coefficient is adapted. In one implementation, this may be accomplished by observing the Gdc, which is directly proportional to the load current, which can be approximated by the Integrative component "I" itself. For a large Gdc, a large "I" coefficient can be used. For a small Gdc, a small "I" coefficient may be used. In one implementation, the Gdc (or equivalently the content of the integrator 506 register) can be directly used to scale the "I" coefficient. By use of this coefficient adaptation, as shown at block 510, the digital controller 402 can maintain the open loop transfer function of the whole system 400 constant when the load current changes. In various implementations, the digital controller 402 maintains the open loop transfer function constant based on information received from the feedback loop.

In various implementations, a change of mode can be taken into account, with respect to the coefficients as well. When changing, for instance, from the second mode to the third mode, the dc-dc converter 100 doubles its gain. Therefore, in order to maintain the same dynamic performance, both "P" and "I" coefficients may be halved. Alternately, the output of the PI controller may be halved in the second mode, with the coefficients unchanged.

Figure 8A:
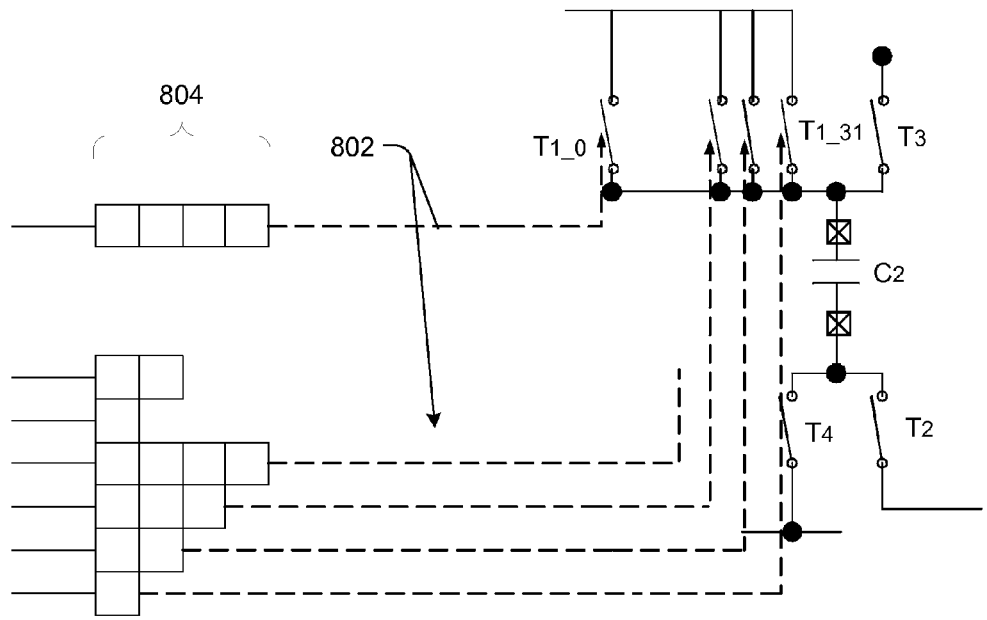
FIG. 8A is a schematic drawing of a portion of a dc-dc converter using slope control techniques according to an implementation.
Figure 8B:
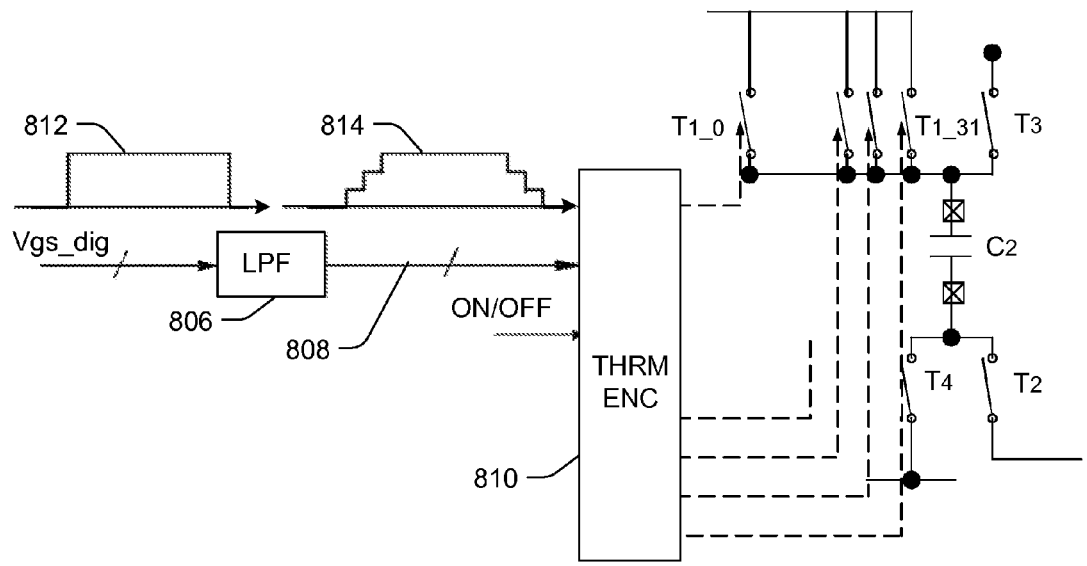
FIG. 8B is a schematic drawing of a portion of a dc-dc converter using slope control techniques according to another implementation.

In an implementation where one or more of the switches T1-T9 are implemented with sets of sub-switches, the digital driving signal generator 404 can drive each individual sub-switch. The impedance/conductance information is translated into a certain number of sub-switches that need to be turned "on." The larger the conductance, the greater the number of sub-switches that need to be turned "on" (this is referred to as a thermometer conversion of the digital conductance representation, and is shown in FIGS. 8A and 8B).

In an implementation, the system 400 may operate using a pulse frequency modulation (pfm) method, at a variable switching frequency. For example, a digital controller 402 may be included in a system 400, where the digital controller is arranged to modulate the switch timing of one or more of the switches T1-T9, based on a load coupled to the output of the dc-dc converter 100. In one instance, the lower the current load of the dc-dc converter 100 becomes, the lower the average switching frequency of the system 400 becomes. A lower average switching frequency generally equates to lower average switching losses, since the switches operate fewer times per time period. In general, the higher the load current is, the shorter the discharge phase will be. Thus, generally, for large loads, the switching frequency will be larger and for small loads the switching frequency will be smaller.

However, in various implementations, a variable switching frequency may be employed that is based on randomly generated values. This technique may be referred to as having a spreading effect on the emission spectrum of the system 400. Accordingly, in an implementation, the digital controller 402 is arranged to regulate the dc-dc converter 100 using pulse frequency modulation according to a randomly varying frequency. The randomly varying frequency may be implemented using one or more of the following techniques:

(1) In one implementation, the charge phase duration of one or more of the energy storage elements C2 and C3 is randomly modulated by adding a random interval to the minimum charge phase duration. For example, in an implementation, the random number generator 602 is arranged to generate a random interval value, and the digital controller 402 is arranged to increase or decrease the charge duration of one or more of the energy storage elements C2 and C3 by the random interval value. (2) In another implementation, the minimum discharge phase duration of one or more of the energy storage elements C2 and C3 is randomly modulated by adding a random interval to the minimum discharge phase duration. For example, in an implementation, the random number generator 602 is arranged to generate a random interval value, and the digital controller is arranged to increase or decrease the discharge duration of one or more of the energy storage elements C2 and C3 by the random interval value. (3) In a further implementation, the conductance of one or more of the switches T1-T9 is randomly selected and adjusted, for example, by the digital controller 402. For example, the amount of charge which is provided from the input source $V_{IN}$ to the output buffer capacitor $C_L$ and the load $R_L$ can change each switching period, and therefore, the discharge phase can be different each switching period, with the result that the switching period can change each switching cycle. In alternate implementations, one or more of the above techniques may be employed concurrently, or another technique may be used to accomplish the same or similar results. Further, in various implementations, one or more of the above techniques may be applied once each switching period or according to another timing scheme.

Figure 6:
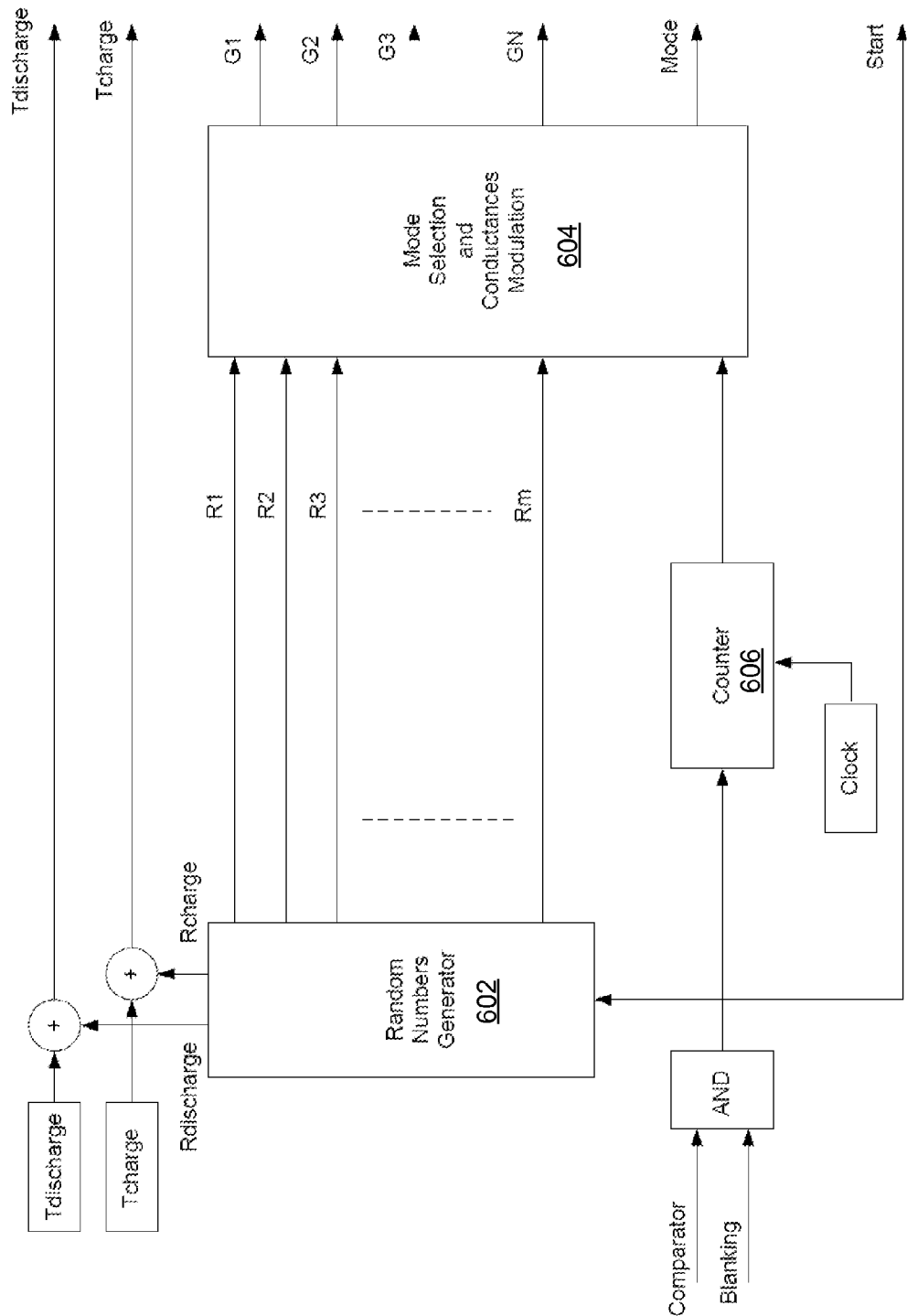
FIG. 6 is a block diagram of a digital controller for a dc-dc converter according to another example implementation.

FIG. 6 is a block diagram of a digital controller for a dc-dc converter 100 according to an example implementation based on randomly varying frequency operation. In an example, once per switching period (e.g. when a comparator triggers), or at another appropriate interval, a set of random numbers is generated by a random number generator 602, for example: Rdischarge, Rcharge, R1, R2, . . . Rm. Rdischarge and Rcharge can be used for implementing options (1) and (2) above. The remaining random numbers (R1, R2, . . . Rm) are used to generate conductance values for the switches T1-T9 comprising the dc-dc converter, as described in option (3) above. Accordingly, in an implementation, the digital controller 402 is arranged to modulate the switch timing of one or more switches T1-T9 based on a random value generated by the random number generator 602.

The digital controller 402 can also implement some additional features. If included, the Mode Selection and Conductance Modulation block 604 can determine, based on the load current, which mode of operation to operate in.

In an implementation, the load current can be monitored by observing the average time of the discharge phase. The digital controller 402 may also include a counter 606 implemented to measure the time between consecutive comparator trigger events. The information may be sent to a low pass filter (not shown), for example, with the output giving an indication of the current capability of the dc-dc converter 100 operating in a certain mode. For instance, when the measured discharge phase gets close to the minimum programmed value Tdischarge, this may indicate that the dc-dc converter 100 is operating close to its maximum current capability for the operating mode, and that a mode change may be recommended (e.g. from the second mode to the third mode, or from the first mode to the second mode). On the other hand, when the measured discharge phase is longer, this may indicates that the operating mode is providing too much current (this condition can cause increased ripple), and a mode change is recommended (e.g. from the third mode to the second mode, or from the second mode to the first mode).

In an implementation where one or more of the switches T1-T9 are implemented as sets of sub-switches, the digital driving signal generator 404 may drive each individual sub-switch. The conductance information output from the Mode Selection and Conductance Modulation block 604 may be translated to an indication (i.e., digital word) that a certain number of sub-switches are to be turned "on." Therefore, the random modulation of the conductance (G1, G2, G3, . . . GN) of a switch T1-T9 that is implemented as a set of sub-switches can be obtained by randomly determining how many sub-switches will be turned on in the next switching period.

In an implementation, an observation of the load current can be also used to shape the random value used to determine the random conductance of a switch T1-T9. For example, if every switch T1-T9 comprises 32 sub-switches, it could be convenient to use a random number within 1-16 when the load current is low or to use a random number within 16-32 when the load current is high.

Example Slope Control

Figure 7A:
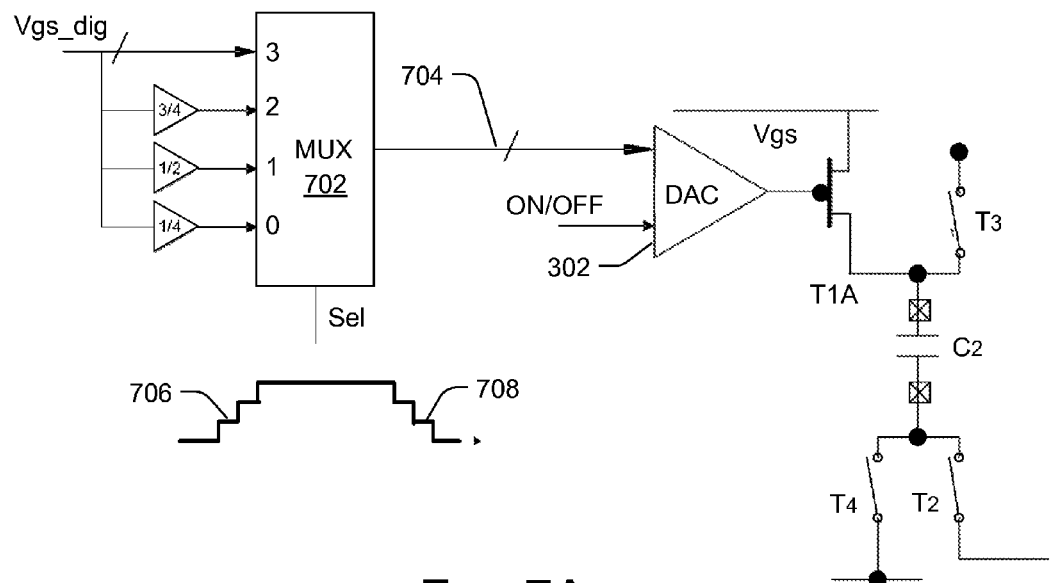
FIG. 7A is a schematic drawing of a portion of a dc-dc converter using a multiplexer and a digital to analog converter according to an implementation.
Figure 7B:
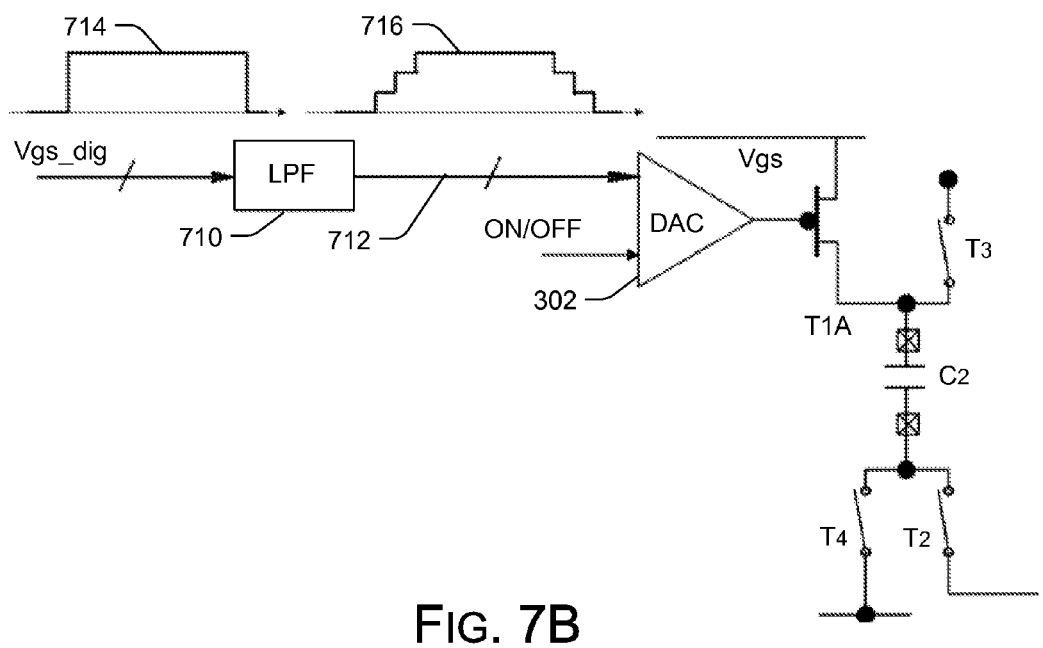
FIG. 7B is a schematic drawing of a portion of a dc-dc converter using a low pass filter and a digital to analog converter according to an implementation.

In various implementations, the slope of the charging and/or discharging phase(s) may be modified, smoothing the transitions from charge to discharge and/or discharge to charge of one or more of the energy storage elements C2 and C3. The amount of current flowing in the switching network 102 or 104 is regulated by selecting the appropriate digital value(s) for the conductance G of one or all the switches T1-T9. In alternate implementations, the digital selection of the conductance G of one or more switches T1-T9 with maximal conductance Gmax can be performed in at least two ways as shown in FIGS. 7A and 7B. In other implementations, other techniques may be used to achieve similar results.

FIG. 7A is a schematic drawing of a portion of a dc-dc converter 100 using a multiplexer (mux) 702 and a digital to analog converter (DAC) 302 according to one implementation. The overdrive voltage ($V_{GS}$) of the switch T1A is regulated via the DAC 302, as described above with reference to FIG. 3. The DAC 302 is a switch control element, since it can be arranged to output a conductance adjustment signal to a switch T1A, based on a load coupled to the output of the dc-dc converter 100.

Additionally, slope control of the switch timing may be accomplished using the mux 702, where the mux 702 is arranged to control a rate of change of the conductance adjustment signal output to the switch T1A. In an implementation, the mux 702 is arranged to regulate a rate of change of a charge phase and/or a discharge phase of the energy storage element C2 or C3. The mux 702 may be arranged to output a slope control signal 704 to the switch control element (e.g., the DAC 302) according to a clock pulse.

In an implementation, as illustrated in FIG. 7A, the mux 702 receives a signal representing a conductance value (i.e., Vgs_dig, the digital word) and one or more scaled signals representing fractions of the conductance value. The scaled signals are shown in FIG. 7A as ¾, ½, and ¼, and represent those fractions of the conductance value Vgs_dig. In alternate implementations, other fractional portions of the conductance value Vgs_dig (e.g., ⅓, ⅔, etc.) may be alternately or additionally used. The scaled signals may be generated by digital scaling elements (e.g., digital logic, etc.) arranged to receive the signal representing the conductance value (Vgs_dig) and output the one or more scaled signals to the mux 702.

The mux 702 is arranged to output the slope control signal 704, comprising the one or more scaled signals and the conductance signal (Vgs_dig), in either an ascending order or a descending order of magnitude, to the switch control element (i.e., DAC 302). For example, the mux 702 may output the signals in the following order: ¼, ½, ¾, and Vgs_dig. Further, the mux 702 may output the signals in the opposite order as well. In an implementation, the mux 702 may output the signals in ascending order on a rising edge of a switch sequence, as shown at 706 in FIG. 7A, and may output the signals in descending order on a falling edge of a switch sequence, as shown at 708 in FIG. 7A. In this way the conductance of the switch(es) is increased slowly over the desired time from 0 to the target conductance value (or vice-versa). Consequently, the current on the energy storage capacitors C2 and/or C3 will increase smoothly from 0 to the requested value (or vice-versa) as they charge (and discharge). As discussed above, the techniques described herein may be applied to a single switch or to some or all of the switches T1-T9, as desired.

In an alternate implementation, as illustrated in FIG. 7B, the slope control element comprises a low pass filter 710. The low pass filter 710 is arranged to receive the conductance adjustment signal (Vgs_dig) and output a smoothed slope control signal 712 to the switch control element (i.e., DAC 302). For example, the low pass filter 710 may be arranged to receive the Vgs_dig signal shown at 714, and output the smoothed signal shown at 716. As above, the smoothed signal 716 stages the switch operation, and thus the charging and discharging of the energy storage capacitors C2 and/or C3.

In other implementations, the conductance of one or more of the switches T1-T9 is set by replacing the one or more switches T1-T9 with a set of sub-switches, and selecting sub-sets of the sub-switches to be turned on and/or off. Digital slope control may be employed as shown in FIGS. 8A and 8B.

In the examples shown in FIGS. 8A and 8B, 32 sub-switches (T1_0–T1_31) are used. As described above, less or more sub-switches may also be used. Accordingly, each of the sub-switches of the set of sub-switches has a maximum conductance substantially equivalent to the maximum conductance of the switch(es) replaced by the sub-switches, divided by the number of sub-switches in the set. When a digital controller 402 requests a certain conductance value G, the value is "thermometer coded" and/or binary weighted and mapped to control lines 802 associated with each individual sub-switch T1_0–T1_31. This coding can be referred to as the digital word described above, since it identifies switches, and indicates a switch configuration for the identified switches. Bits of the digital word are associated with control lines and individual sub-switches. For instance, if G=19 in FIG. 8A, when the "switch T1" is to be turned "on," the first 19 lines from the bottom-up are set equal to 1, and the rest of the lines remain equal to 0. Sub-switches (T1_0–T1_31) with a control line 802 equal to 1 may be closed, while sub-switches (T1_0–T1_31) with a control line 802 equal to 0 remain open, for example.

In an implementation, slope control is obtained by a slope control element (e.g., digital controller 402, digital driving signal generator 404, etc.) inserting different delay elements 804 (by one clock cycle, for example) on each control line 802. In the example above, the first line 802 has 1 delay element 804 inserted, the second 2, the third 3, and the fourth 4 delay elements 804. In the example shown in FIG. 8A, at the 5$^{th}$ line, the delay elements 804 are inserted by repeating the scheme 1, 2, 3, 4, 1, 2, 3, 4, . . . and so on.

Based on the inserted delay elements 804, the switch operation of sub-switches T1_0–T1_ 31 will be delayed different amounts with each switching cycle. In the example where G=19, 5 sub-switches are turned on after 1 cycle, 5 after 2 cycles, 5 after 3 cycles, and finally 4 after 4 cycles. This scheme is generally equivalent to the implementation of FIG. 7A. Over time, the conductance G is smoothly increased and consequently the current flowing in the switch is also smoothly increased.

In one implementation, the G=19 lines are set back to 0 again to turn off the associated switches in a staged scheme as above, including delay elements 804. Again, 5 sub-switches are tuned off after 1 cycle, 5 after 2 cycles, 5 after 3 cycles, and finally 4 after 4 clock cycles.

In an alternate implementation, as shown in FIG. 8B, a low pass filter 806 is used as alternative to the delay elements, and acts as a slope control element. As discussed above with reference to FIG. 7B, the low pass filter 806 receives the conductance adjustment signal (Vgs_dig) and outputs a smoothed slope control signal 808 to a switch control element (e.g., thermal encoder 810). The thermal encoder 810 is arranged to control a switch state of one or more of the set of sub-switches T1_0–T1_31, based on a load coupled to an output of the dc-dc converter 100. For example, the low pass filter may be arranged to receive the Vgs_dig signal shown at 812, and output the smoothed signal shown at 814. As above, the smoothed signal 814 stages the switch operation, and thus the charging and discharging of the energy storage capacitors C2 and/or C3. Thus, the low pass filter 806 is arranged to control a rate of change of the switch state of one or more of the set of sub-switches T1_0–T1_31. Additionally, the low pass filter 806 is arranged to regulate a rate of change of the charge phase and/or the discharge phase of the energy storage element C2 or C3.

Figure 9:
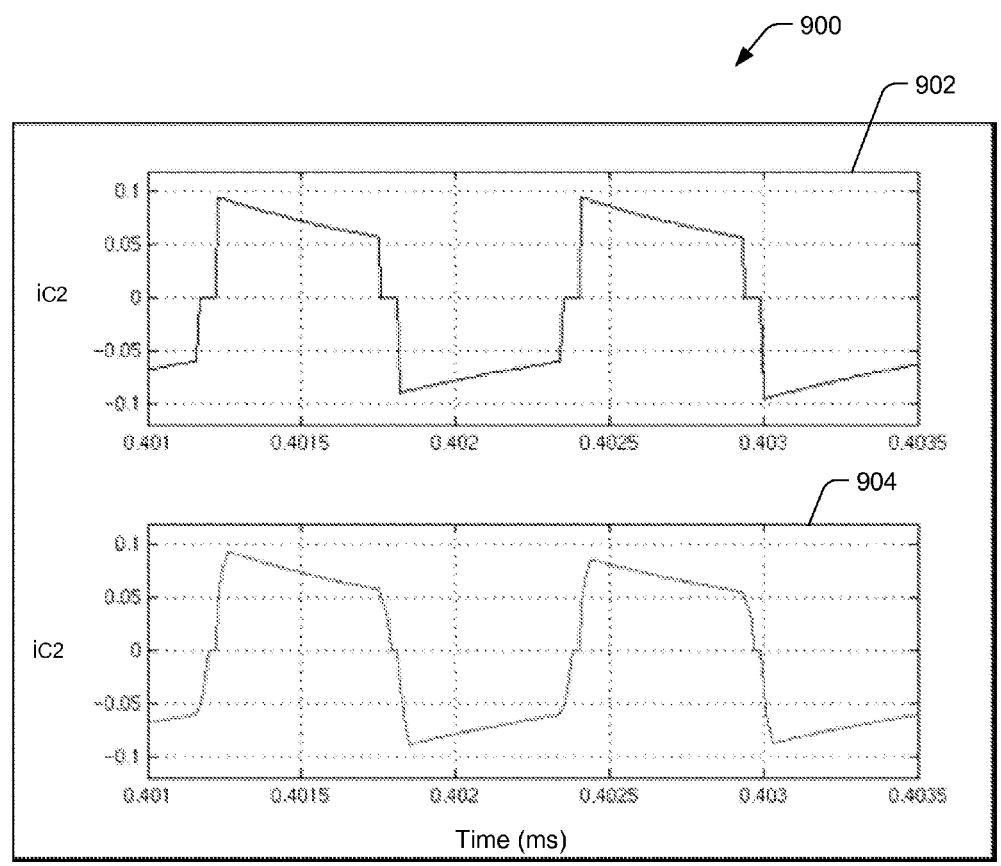
FIG. 9 is an example waveform illustrating slope control techniques according to an implementation.

FIG. 9 is an example of two waveforms illustrating slope control techniques according to an implementation. The waveforms show the current that flows in energy storage element C2 of FIG. 1A during a charge phase (positive) and a discharge phase (negative). The upper diagram 902 represents the scenario where slope control is not used, and the switches T1-T4 are turned on and off immediately. The lower diagram 904 represents the scenario where slope control is used. As can be seen in diagram 904, the transitions from a charging phase to a discharging phase (and vice-versa) are smoother. Thus, slope control techniques modify switching characteristics to reduce instant phase changes of the energy storage element(s) C2 and C3.

Representative Processes

Figure 10A:
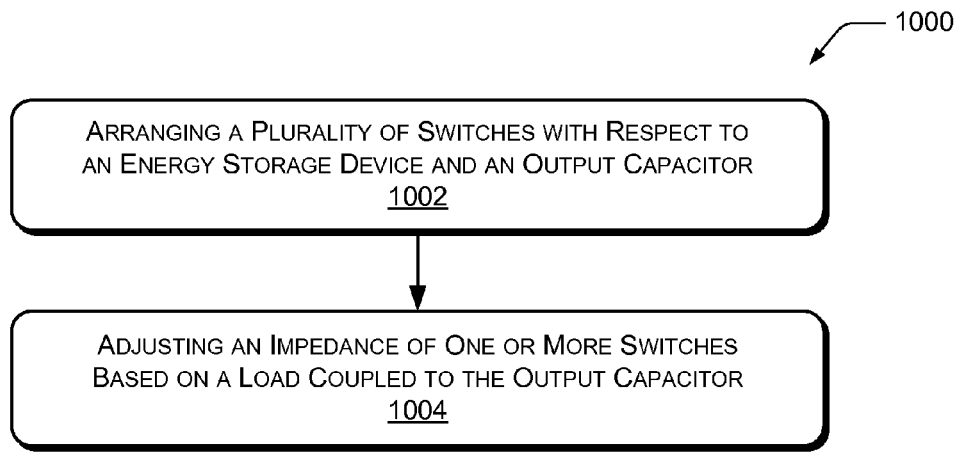
FIG. 10A is a flow diagram illustrating an example process of controlling switching of a dc-dc converter according to an implementation.

FIG. 10A illustrates a representative process 1000 for implementing switching control for a dc-dc converter (such as the dc-dc converter 100). This is also described as regulating the dc-dc converter 100, as the switching control regulates an output of the dc-dc converter. An example process 1000 includes modifying switching characteristics based on a magnitude of the load current. The switching characteristics may be modified to reduce, minimize, or eliminate switching losses in the dc-dc converter. The process 1000 is described with reference to FIGS. 1-9.

At block 1002, the process includes arranging a plurality of switches (such as switches T1-T4) with respect to an energy storage device (such as energy storage device C2) and an output capacitor (such as buffer capacitor $C_L$). In an implementation, the process includes coupling the plurality of switches to the energy storage device such that the energy storage device is in series with the output capacitor when the plurality of switches is in a first switching configuration and such that the energy storage device is in parallel with the output capacitor when the plurality of switches is in a second switching configuration. For example, at least two switches may be coupled to each terminal of the energy storage device. By opening one of the switches at each terminal and closing the other (a first configuration), the energy storage device is in series with the output capacitor. By opening the other of the switches at each terminal and closing the first ones (a second configuration), the energy storage device is in parallel with the output capacitor.

In one implementation, the process may include determining which switches of the plurality of switches are in an open state and which switches of the plurality of switches are in a closed state based on a digital word. A digital word may include, for example, a string of bits arranged to represent switching information such as: switch identification, desired switch impedance, and the like. In an implementation, the process may also include selecting a first sub-set of the plurality of switches to be in an open-state and selecting a second sub-set of the plurality of switches to be in a closed-state, based on the load coupled to the output capacitor.

In various implementations, the process includes selecting one or more of the plurality of switches to be in a fixed state when the load coupled to the output capacitor is reduced. This has an effect of reducing the number of operative switches for reduced loads. Conversely, the process may also include selecting one or more of the plurality of switches to change states with each switching cycle when the load coupled to the output capacitor is increased, thus increasing a number of operative switches for greater loads. Accordingly, individual switches may be "cut in" or "cut out" of operation with each switching cycle, based on changes in the load current.

In an implementation, the process may include selecting a third sub-set of the plurality of switches to be in a fixed state for a preset number of switching cycles, thus maintaining a number of switches for a preset number of switching cycles.

In one implementation, a process includes selecting one or more of the plurality of switches for impedance adjustment based on a digital word. In various implementations, a single digital word or multiple digital words may be employed. Additionally, separate digital words may be associated to individual switches.

At block 1004, the process includes adjusting an impedance of one or more of the plurality of switches based on a load coupled to the output capacitor. In one implementation, adjusting the impedance of a switch includes selecting a gate-source voltage for a mos device. In another implementation, adjusting an impedance includes selecting a sub-set of sub-switches to be on or off, where the sub-switches in total represent a single switch or a set of switches. Thus, the impedance of the total set of switches may be substantially equal to the impedance of the switch or switches being represented by the set.

Figure 10B:
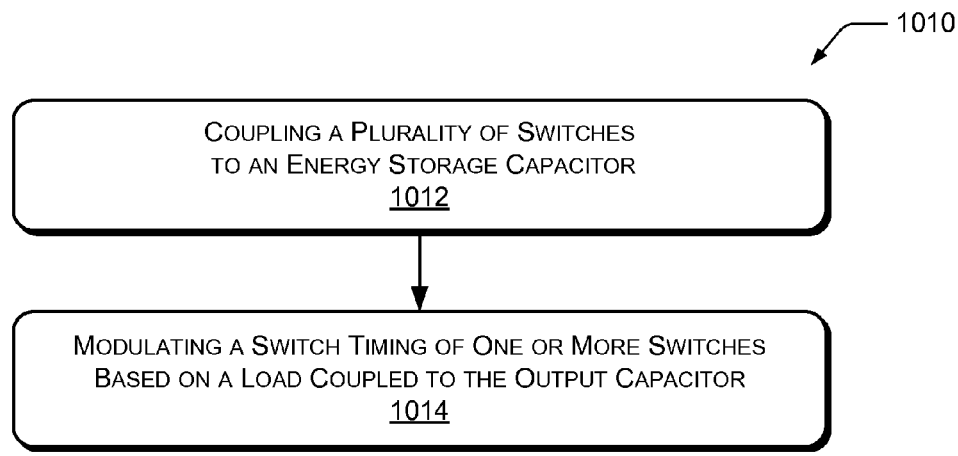
FIG. 10B is a flow diagram illustrating an example process of controlling switching of a dc-dc converter according to another implementation.

FIG. 10B illustrates another representative process 1010 for implementing switching control for a dc-dc converter (such as the dc-dc converter 100). This is also described as regulating the dc-dc converter 100, as the switching control regulates an output of the dc-dc converter. An example process 1010 includes modifying switching characteristics based on a magnitude of the load current. The switching characteristics may be modified to reduce, minimize, or eliminate switching losses in the dc-dc converter. The process 1010 is described with reference to FIGS. 1-9.

At block 1012, the process includes coupling a plurality of switches (such as some of all of switches T1-T9) to an energy storage capacitor (such as one or more of energy storage elements C2 and C3) of a dc-dc converter (such as dc-dc converter 100). The switches are arranged to control charging and discharging of the energy storage capacitor. In one implementation, one or more of the switches is comprised of a multiplicity of sub-switches. In a further implementation, the process includes adjusting the conductance of the one or more switch(es). This may be accomplished by selecting a random number of the sub-switches (that comprise the switch(es)) to be in a closed state.

In another implementation, the process includes selecting a random number of the sub-switches within a preset range based on the load coupled to the output of the dc-dc converter. For example, if one of the switches T1-T9 comprises 32 sub-switches, a random number within 1-16 can be selected when the load current is low or a random number within 16-32 can be selected when the load current is high.

In an implementation, the process includes adjusting a charge duration of the energy storage capacitor based on a random interval value. This may include lengthening or shortening the charge duration by a random interval value. In an alternate implementation, the process includes adjusting a discharge duration of the energy storage capacitor based on a random interval value. Again, this may include lengthening or shortening the discharge duration by a random interval value.

In one implementation, the process includes measuring an average discharge duration of the energy storage capacitor, and filtering the measurement to determine a load current of the dc-dc converter. For example, a counter may be used to measure the average discharge duration, and a digital controller may adjust one or more of the switches when a count at the counter meets a preset threshold. Accordingly, the preset threshold may represent a load current level.

At block 1014, the process includes modulating the switch timing of one or more of the plurality of switches based a load coupled to an output of the dc-dc converter.

In one implementation, the process includes regulating the dc-dc converter using a pulse frequency modulation (PFM) technique according to a randomly varying frequency. For example, including varying the modulation frequency by adding a random value to the charge duration and/or the discharge duration of the energy storage capacitor. In another implementation, the process includes adjusting the conductance of one or more of the plurality of switches based on a random value. This may include adding to the conductance or subtracting from the conductance the value of a random variable.

The order in which the processes 1000 and 1010 are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, the processes can be implemented in any suitable hardware, software, firmware, or a combination thereof, without departing from the scope of the subject matter described herein.

In alternate implementations, other techniques may be included in the processes 1000 and 1010 in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:

1. A system comprising:
a direct current to direct current converter (dc-dc converter), including:
an energy storage element; and
a plurality of switches coupled to the energy storage element; and
a switch control element arranged to output a conductance adjustment signal to one or more of the plurality of switches, based on a load coupled to an output of the dc-dc converter;
a slope control element arranged to control a rate of change of the conductance adjustment signal, the control of the rate of change of the conductance being provided by a smoothed version of the conductance adjustment signal; and
wherein the slope control element includes a low pass filter arranged to receive a digital word representing a conductance value and output a smoothed slope control signal, the smoothed slope control signal being the smoothed version of the conductance adjustment signal.

2. The system of claim 1, wherein the slope control element is arranged to regulate a rate of change of at least one of a charge phase and a discharge phase of the energy storage element.

3. The system of claim 1, wherein the switch control element comprises a digital to analog converter (DAC) arranged to output the conductance adjustment signal to the one or more of the plurality of switches.

4. A system comprising:
a direct current to direct current converter (dc-dc converter), including:
an energy storage element; and
a plurality of switches coupled to the energy storage element, one or more of the plurality of switches comprising a set of sub-switches;
a switch control element arranged to control a switch state of one or more of the set of sub-switches, based on a load coupled to an output of the dc-dc converter;
a slope control element arranged to control a rate of change of the switch state of the one or more of the set of sub-switches, the slope control element to control the rate of change of the switch state of the one or more of the set of sub-switches in accordance with a smoothed version of a conductance adjustment signal; and
wherein the slope control element includes a low pass filter arranged to receive a digital word representing a conductance value and output a smoothed slope control signal to the switch control element, the smoothed slope control signal being the smoothed version of the conductance adjustment signal.

5. The system of claim 4, wherein each of the sub-switches of the set of sub-switches has a maximum conductance substantially equivalent to a maximum conductance of the one or more of the plurality of switches divided by a number of sub-switches in the set.

6. The system of claim 4, wherein the slope control element is arranged to regulate a rate of change of at least one of a charge phase and a discharge phase of the energy storage element.

7. The system of claim 4, wherein the switch control element controls the switch state of the one or more of the set of sub-switches based on a digital word received at the switch control element.

8. The system of claim 7, wherein the digital word represents a conductance value for the one or more of the plurality of switches comprised of the set of sub-switches.

9. The system of claim 7, wherein the digital word represents which sub-switches of the set of sub-switches are in an open state, and which sub-switches of the set of sub-switches are in a closed state.

10. The system of claim 7, wherein the switch control element is arranged to map bits of the digital word to sub-switches of the set of sub-switches.

11. The system of claim 10, further comprising control lines, and wherein the switch control element is arranged to map the bits of the digital word to the sub-switches of the set of sub-switches via the control lines.

12. The system of claim 7, wherein the slope control element is arranged to insert delays configured to delay switching of one or more sub-switches of the set of sub-switches.

13. The system of claim 7, further comprising control lines mapping bits of the digital word to sub-switches of the set of sub-switches, and wherein the slope control element is arranged to insert one or more delay elements at the control lines during each clock cycle to delay switching of the sub-switches based on a number of delay elements inserted.

14. The system of claim 13, wherein the slope control element is arranged to insert sets of ascending or descending numbers of delay elements at sets of adjacent control lines.

* * * * *